US012759482B2

(12) United States Patent
Magnfält et al.

(10) Patent No.: US 12,759,482 B2
(45) Date of Patent: Oct. 13, 2026

(54) CONNECTOR HOLDER FOR AN ELECTRICAL CONNECTION ASSEMBLY FOR A WIRING HARNESS OF A VEHICLE

(71) Applicant: Volvo Car Corporation, Gothenburg (SE)

(72) Inventors: Daniel Magnfält, Gothenburg (SE); Erik Ekstrand, Gothenburg (SE); Nathalie Josefsson, Gothenburg (SE); Mats Roos, Gothenburg (SE); Phu Lieng, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 336 days.

(21) Appl. No.: 18/421,348

(22) Filed: Jan. 24, 2024

(65) Prior Publication Data

US 2024/0253583 A1 Aug. 1, 2024

(30) Foreign Application Priority Data

Jan. 26, 2023 (EP) .................................... 23153537

(51) Int. Cl.
*B60R 16/02* (2006.01)
*B60R 16/023* (2006.01)
(Continued)

(52) U.S. Cl.
CPC ...... *B60R 16/0215* (2013.01); *B60R 16/0238* (2013.01); *H01B 7/0045* (2013.01); *H01B 7/40* (2013.01)

(58) Field of Classification Search
CPC .............................. H01R 7/00; B60R 16/0215
(Continued)

(56) References Cited

U.S. PATENT DOCUMENTS 2,810,114 A * 10/1957 Shaw ................. H01R 13/6315 439/248
6,390,841 B1 * 5/2002 Zaguskin ........... H01R 13/6315 439/248

(Continued)

FOREIGN PATENT DOCUMENTS

CN 109473833 A 3/2019
EP 1445840 A1 8/2004

OTHER PUBLICATIONS

Extended European Search Report received for European Application Serial. No. 23153537.8 dated Jun. 22, 2023, 10 pages.

*Primary Examiner* — Phuong K Dinh
(74) *Attorney, Agent, or Firm* — Amin, Turocy & Watson, LLP

(57) ABSTRACT

A connector holder can comprise a main portion for attaching a first electrical connector of the electrical connection assembly thereto or having the first electrical connector attached thereto, a second electrical connector being connectable to the first electrical connector along an assembly axis, the assembly axis extending along the attachment of the first electrical connector to the main portion. The connector holder can comprise at least two attachment portions for attaching the connector holder to a base assembly part of the electrical connection assembly, and at least two spring portions, each of the spring portions being connected to a respective one of the attachment portions and having a spring characteristic to allow movement of the main portion in a movement plane oblique to the assembly axis when the connector holder is attached to the base assembly part via the attachment portions.

20 Claims, 7 Drawing Sheets

(51) Int. Cl.
*H01B 7/00* (2006.01)
*H01B 7/40* (2006.01)

(58) Field of Classification Search
USPC .......................................... 439/74, 247, 248
See application file for complete search history.

(56) References Cited

U.S. PATENT DOCUMENTS 10,116,071 B2 * 10/2018 Li ........................ H01R 12/714
10,833,443 B2 * 11/2020 Morita ................. H01R 13/631

* cited by examiner

CONNECTOR HOLDER FOR AN ELECTRICAL CONNECTION ASSEMBLY FOR A WIRING HARNESS OF A VEHICLE

CROSS-REFERENCE TO RELATED APPLICATIONS

This application claims the benefit of and priority to pending EP patent application Ser. No. 23/153,537.8, filed Jan. 26, 2023, and entitled "CONNECTOR HOLDER FOR AN ELECTRICAL CONNECTION ASSEMBLY FOR A WIRING HARNESS OF A VEHICLE," the entirety of which is hereby incorporated by reference herein.

TECHNICAL FIELD

The present disclosure relates to a connector holder for an electrical connection assembly for a wiring harness of a vehicle, the electrical connection assembly, and a vehicle.

BACKGROUND

Electrification and demand for more customer functionality leads to a growing number of electrical connectors in vehicles. The wiring harness reaches all parts of the vehicle. Harness assembly in plant and connection of electrical connectors is a large fraction of the total assembly time of vehicles and is almost exclusively performed by manual labor. In addition, electrical connectors often lead to ergonomic issues from high assembly forces and/or assembly in positions that are difficult to reach or lead to inefficient designs to allow for manual assembly.

Also, meeting the required tolerances is often a problem for the assembly. If the tolerances are not met, electrical failures in the vehicle may occur. Detecting such errors may be very time-consuming and therefore cost-intensive.

In the automotive industry, wiring harnesses have mostly been designed to circumvent the above issues, e.g., by adding overlength on the harness to allow for manual assembly outside of the intended position with increased cost and assembly time.

No assembly concept is known which solves the ergonomic issues without technical drawbacks having economic disadvantages, such as overlength or tolerance problems.

SUMMARY

The problem is to provide an electrical connection assembly that at least partially solves at least one of the above problems.

The problem is at least partially solved or alleviated by the subject matter of the independent claims of the present disclosure, wherein further examples are incorporated in the dependent claims.

According to a first aspect, there is provided a connector holder for an electrical connection assembly for a wiring harness of a vehicle, the connector holder comprising:

- a main portion for attaching a first electrical connector of the electrical connection assembly thereto or having the first electrical connector attached thereto, the first electrical connector in particular being configured as a plug or a socket, a second electrical connector being connectable to the first electrical connector along an assembly axis, the assembly axis extending along the attachment of the first electrical connector to the main portion or being at least partially determined by the attachment of the first electrical connector to the main portion,
- at least two attachment portions for attaching the connector holder to a base assembly part of the electrical connection assembly, and
- at least two spring portions, each of the spring portions being connected to a respective one of the attachment portions and having a spring characteristic to allow movement of the main portion in a movement plane oblique to the assembly axis when the connector holder is attached to the base assembly part by means of the attachment portions.

The connector holder having the attachment portions and the spring portions is flexible in the movement plane by allowing elastic deformation of the spring portions. Allowing it to move when forces are being exerted onto the first electrical connector mounted or, in other words, mechanically connected thereto. This allows for greater tolerance ranges because it reduces the risk that the respectively connected electrical connectors or a thereto attached wiring harness and/or electrical component breaks. This advantage may for example, further be used to use shorter wiring harnesses and to ergonomically improve the assembly process.

Tolerances are an issue for autodocked connector assembly. In a vehicle installation, a position tolerance of a mechanical part (after e.g. manual assembly) can be in an order of ~1 mm, while a connector for autodocking requires a position tolerance in an order of ~0.1 mm. The connector holder according to the invention may ensure that the connector can be assembled in the correct position even if there is a difference of position tolerances and therefore probably a misalignment between the mechanical part and the connector as it allows for the connector to float. So, it may be an enabler for autodocking or automated assembly of connectors.

While the electrical connection assembly of this disclosure is primarily suggested to be used for a wiring harness of a vehicle, other components inside of the vehicle may be connected via the electrical connection assembly as well, as will be explained in more detail by the example of an electrical component. Also, the electrical connection assembly is not limited to be used in a vehicle, but it can also be used in other applications or devices benefitting from a higher tolerance and ergonomic advantages when electrically connecting wires, electrical components, and so on with one another.

The electrical connectors may be respectively designed as male and female or socket and plug type connectors such that they can be mated with each other. Any mating or locking mechanism may be used. For example, to simplify disassembly, it is possible to use friction locked electrical connectors. Alternatively, electrical connectors with locking latch may be used.

Moreover, the electrical connectors may be stand-alone electrical connectors or attached to further components. Particularly, the electrical connectors or at least one of them may be an electrical component having the respective electrical connector. For example, the first electrical connector may be part (integral or removably attached) of an electric component. Accordingly, the connector holder may either hold an electrical connector itself or a more complex part having the electrical connector, such as an electrical component. Accordingly, the flexible properties of the connector holder may be used to move an entire electrical component, if desired.

The connector holder comprises several portions, namely a main portion, at least two attachment portions and at least two spring portions. These portions are connected to each other. They may be designed monolithically or, in other words, integrally with each other. Also, the herein mentioned mount interface may be designed monolithically with the connector holder. This has the advantage of a very robust connector holder that can absorb high forces in order to ease any tension on the connectors themselves.

The spring characteristic of the spring portions may be configured by choice of material, shape and dimensions, e.g., thickness, of the spring portions. Material-wise, the connector holder may be made from any material, in particular elastic material, including metals and/or synthetic materials. Regarding the shape, possible examples will be given further below.

The movement plane is a plane spanned by two axes. The movement of the main portion and thereby the first electrical connector, which is attached to the main portion, is being enabled in the movement plane. This does not limit the main portion to perform movements along the assembly axis if necessary and at least to a certain degree such that tolerances can be made up along the assembly axis as well. The movement plane being oblique to the assembly axis in other words means that the assembly axis is inclined with respect to the movement plane. The oblique orientation or, in other words, inclination may be substantially perpendicular or, in other words, at an angle of substantially 90°, as will be explained later in more detail.

The main portion may comprise a mount interface for receiving a first electrical connector of the electrical connection assembly along the assembly axis and mounting the first electrical connector to the main portion. In other words, it is possible that the main portion is configured for attaching the first electrical connector of the electrical connection assembly thereto, particularly along the assembly axis. In this case, by means of assembly along the assembly axis, the first electrical connector may be mechanically attached to the main portion of the connector holder. In this case, the assembly axis may be a coinciding axis for the attachment of the first electrical connector to the main portion and for the attachment of the second electrical connector to the first electrical connector. Accordingly, a particularly easy assembly may be provided by matching assembling directions for different assemblies. The first electrical connector can be a separate component mountable to the main portion by means of the mount interface. The mount interface may for example, be configured with preloaded claws or hooks, between which the first electrical connector can be positioned and locked by means of the preload.

Alternatively, the mount interface may be omitted and/or the main portion may have the first electrical connector attached thereto, particularly permanently attached thereto. Such attachment may be established by means of the assembly as described or, alternatively, when the mount interface is omitted, by means of an integral design of the main portion and the first electrical connector or parts of it, for example. In such case, the first electrical connector can be at least partially, particularly with its connector housing, designed integrally with the main portion. Particularly in such case, the assembly axis may be at least partially determined or defined by the attachment of the first electrical connector to the main portion. For example, the orientation of the first electrical connector defined by its attachment to the main portion may define along which axis or direction the second electrical connector can be mated with the first electrical connector. Another part in the definition or determination of the assembly axis for connecting the respective electrical connectors with each other may of course be the design of the connector(s) themselves. The integral design has the advantage that less assembly steps are necessary to assemble the electrical connection assembly. However, the connector holder may be more difficult and expensive to manufacture with the first electrical connector being permanently attached thereto.

The main portion may have an interface aperture enabling access for electrical connection to the first electrical connector when the first electrical connector is attached to the main portion. This interface aperture may be located underneath the mount interface, if present. The interface aperture thereby makes it ergonomically easy to electrically connect the wiring harness, for example, to the first electrical connector.

The movement plane may be substantially perpendicular to the assembly axis.

Thereby, the two axes spanning the movement plane are substantially perpendicular to the assembly axis. Substantially perpendicular includes deviations of a perpendicular orientation of up to 10 degrees in either direction. By having a substantially perpendicular orientation, a tolerance compensation in either of the two axes of the movement plane or the assembly axis may be optimally performed by the connector holder.

The spring portions may be configured as curved links between the main portion and the attachment portions. The curvature of these links is a simple and cost-effective way to provide the spring characteristics that are needed to compensate for tolerances along the entire electrical connection of a wiring harness.

The curved links may have an S- or meander-formed curvature. The curvature refers to the extension in length of the links or spring portions in the movement plane, meaning the axes spanning the movement plane. An S-formed curvature is a particularly simple curvature enabling simple yet effective movement of the main portion and thereby the first electrical connector in many different directions. Adding more curves, the S-formed curvature may be transitioned in design to a meander-formed curvature. Such curvature further increases the flexibility of the connector holder.

The curved links may have a band or tape shaped profile. The band or tape width particularly extends perpendicular to the movement plane or along the assembly axis. The band or tape shape of the profile of the curved links thereby allows for mostly unrestricted movement of the curved links in the movement plane, while limiting the movement range along the assembly axis.

The attachment portions may be designed as pins. The pins may be extending in length along the assembly axis or substantially perpendicular to the movement plane. Such pins may be inserted into corresponding pin apertures, in particular pin holes, of the base assembly part for attaching the connector holder to the base assembly part. The base assembly part can be fixed to a structure or frame of the vehicle. The pins enable a simple and quick assembly and disassembly with the base assembly part, in particular when they also extend in length along the assembly axis.

The pins may be designed as rotation pins, the rotation pins being able to rotate within pin apertures of the base assembly part. The pin apertures or pin holes can be designed (slightly) larger in diameter than the rotation pins. Thereby, a rotation of the pins is enabled, which in turn enables greater elastic deformation of the spring portions for more movement of the first electrical connector in any direction of the movement plane. Accordingly, greater tolerances can be compensated for.

The pins may have circumferentially provided supporting rings for supporting the connector holder on the base assembly part when the pins are inserted into pin apertures of the base assembly part. The diameters of the support rings may be greater than diameters of the pin apertures for this purpose. This means that they may be sized such that the support rings support the connector holder on the base assembly part when the pins are inserted into the pin apertures. More particularly, the support rings may be provided at a distance measured along the assembly axis from the main portion and/or the spring portions. In other words, the support rings may be positioned below a lower edge of the main portion and/or the spring portions. Thereby, the main portion and the spring portions may be lifted or raised atop of the base assembly part. Accordingly, when the main portion is moved when the spring portions are subjected to a force elastically deforming them, the main portion and the spring portions are not obstructed by the base assembly part or the attachment thereto. Accordingly, unobstructed movement of the connector holder in the movement plane is enabled. Also, a certain movement of the connector holder along the assembly axis is enabled. The movement range along the assembly axis is determined by the distance of the support rings to the lower edge of the main portion and spring portions.

The connector holder may comprise at least four attachment portions and at least four spring portions. While it is possible to have less attachment portions and spring portions, such as three of each, for example, having at least four proved to be advantageous to have a large movement range of the main portion of the connector holder and thereby the first electrical connector.

According to a second aspect, there is provided an electrical connection assembly for a wiring harness of a vehicle, the electrical connection assembly comprising:

- the connector holder according to the first aspect of this disclosure, and
- the first electrical connector for electrically connecting to a second electrical connector of the electrical connection assembly, the first electrical connector being attached to the connector holder, the second electrical connector in particular being configured as a plug or a socket such that it corresponds for electrically connecting to the first electrical connector.

Besides having the connector holder and the first electrical connector, the electrical connection assembly may have further parts as described in this disclosure. For example, the electrical connection assembly may further comprise the base assembly part and/or the second electrical connector. Also, the electrical connection assembly may include any number of wires, cables, wiring harnesses and electrical components, which may be electrically connected to each other via the two electrical connectors.

The respective parts of the electrical connection assembly may be available assembled, i.e., mechanically and/or electrically connected to each other, or unassembled. For example, the connector holder may be mechanically attached to the base assembly part by means of the previously mentioned pins being inserted into the pin apertures, or these parts may be provided in an unassembled state. Of importance is merely whether the corresponding parts for assembly of the electrical connection assembly are provided.

The electrical connection assembly may comprise a further connector holder, the further connector holder comprising a receptacle connector interface for receiving the second electrical connector along the assembly axis and mounting the second electrical connector to the further connector holder. Using the further connector holder, it is possible to improve the ergonomics for the assembly further. In the alternative, the further connector holder may have the second electrical connector permanently attached thereto, e.g., by means of integral design.

Particularly, the further connector holder may have at least two further attachment portions, in particular at least four further attachment portions, for attaching the further connector holder to the base assembly part. The further attachment portions may be designed as attachment domes, for example. The base assembly part may comprise corresponding attachment means such as attachment apertures for inserting and fixing the attachment domes therein, particularly by means of a form fit.

The receptacle connector interface and/or the second electrical connector may have a funnel shape for guiding the first electrical connector for electrical connection to the second electrical connector mounted to the further connector holder. The funnel shape enables auto-docking or, in other words, blind mating of the two electrical connectors with each other.

This further eases and accelerates the assembly of the electrical connection assembly. The funnel shape may be provided in the receptable connector interface itself or on a connector housing of the second electrical connector, for example. The funnel shape may be widening in the direction, particularly along the assembly axis, towards the first electrical connector or, in other words, away from the second electrical connector, such that the funnel gets narrower when the first electrical connector is guided along it and ultimately mates with the second electrical connector.

The electrical connection assembly may further comprise an electrical component, the electrical component comprising the second electrical connector and a printed-circuit board connected to the second electrical connector. While it is possible to use the electrical connection assembly for connecting wiring harnesses or portions thereof with each other, it is also possible to directly connect an electrical component, such as a vehicle control unit, for example, with the wiring harness. In this case, the wiring harness may be wired to the first electrical connector and the electrical component may have the second electrical connector mating with the first electrical connector. For the second electrical connector of the electrical component, it is possible that the second electrical connector has exposed electrical connection pins because a type of housing protecting these from being damaged may be formed by the further connector holder, forming a type of a cover of the electrical component. In the alternative, it is possible to provide a separate connector housing for the second electrical connector, adding a further layer of security but also material, weight, and cost.

According to a third aspect, there is provided a vehicle having the electrical connection assembly according to the second aspect of this disclosure, the wiring harness of the vehicle being electrically connected to the first electrical connector and/or the second electrical connector.

As previously explained, the respective other electrical connector may be connected to the same or another wiring harness or an electrical component, for example.

The attachment of the electrical connection assembly inside the vehicle may be performed by means of the base assembly part. Such base assembly part may be attached to a structure or frame inside the vehicle. For example, the base assembly part may comprise attachment recesses, through which the base assembly part may be bolted to the vehicle structure or frame. Adhesion or form fit are alternative exemplary options of attachment to structures of the vehicle.

It should be noted that the above examples may be combined with each other irrespective of the aspect involved. Accordingly, the connector holder may be combined with the electrical connection assembly and vice versa.

These and other aspects of the present disclosure will become apparent from and elucidated with reference to the examples described hereinafter.

BRIEF DESCRIPTION OF DRAWINGS

Examples of the disclosure will be described in the following with reference to the following drawings.

DETAILED DESCRIPTION

The figures are merely schematic representations and serve only to illustrate examples of the disclosure. Identical or equivalent elements are in principle provided with the same reference signs.

Figure 1:
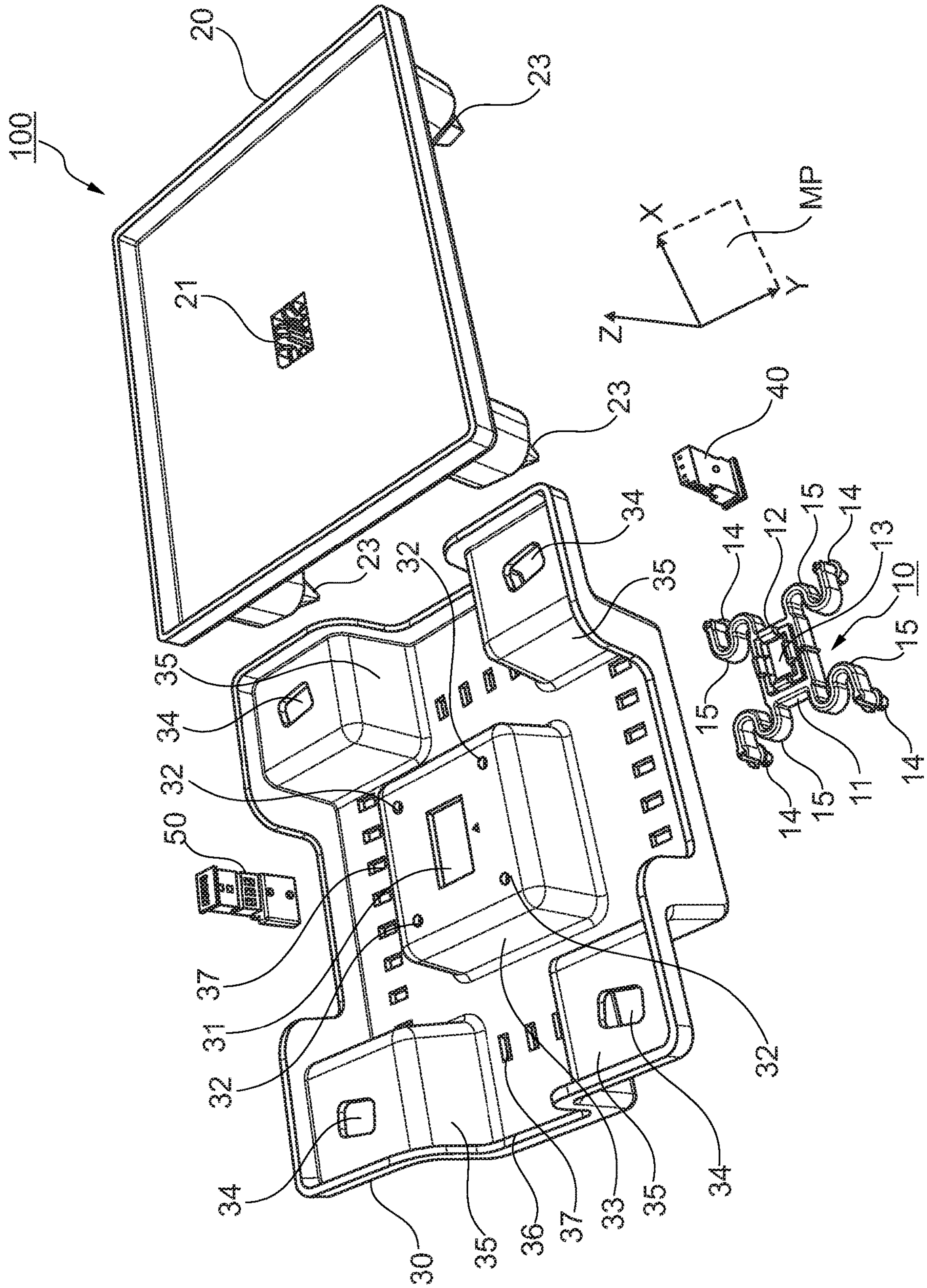
FIG. 1 shows an exploded view of an example of an electrical connection assembly for a wiring harness of a vehicle in an unassembled state.
Figure 7:
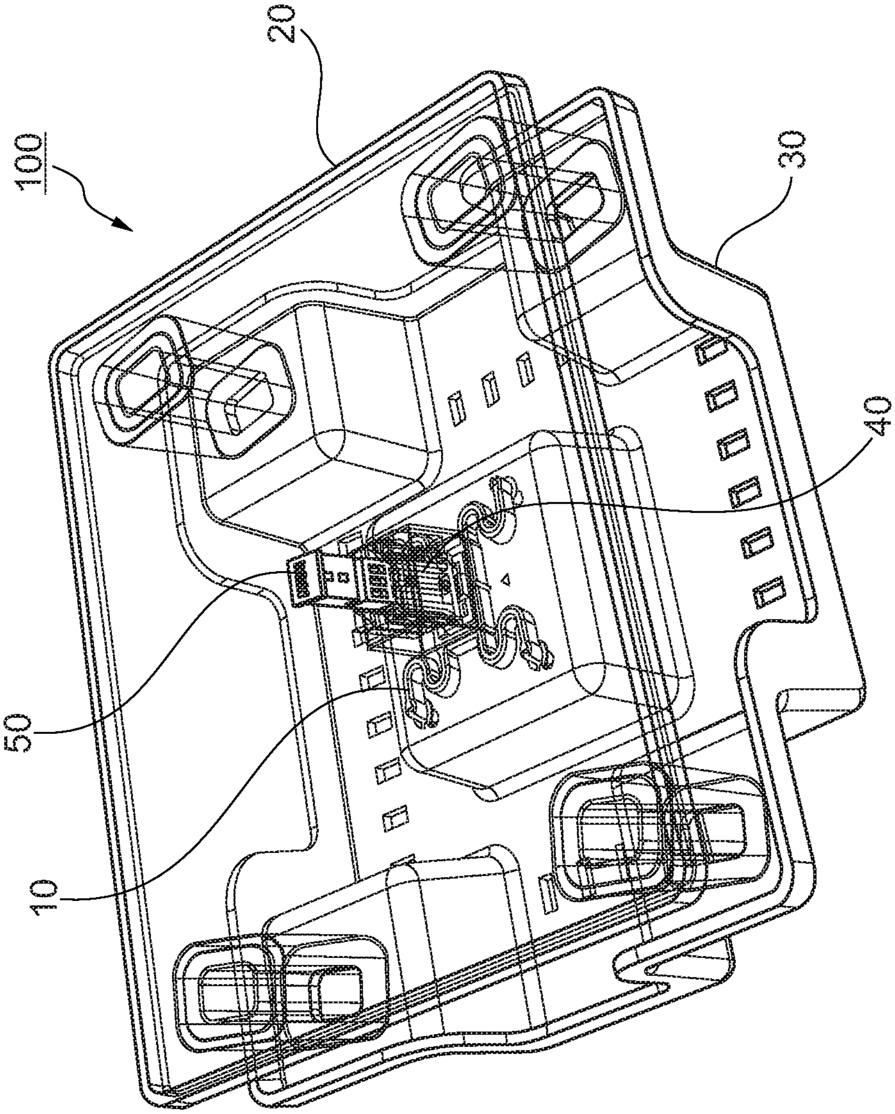
FIG. 7 shows a perspective view of the electrical connection assembly of FIG. 1 in an assembled state.
Figure 9:
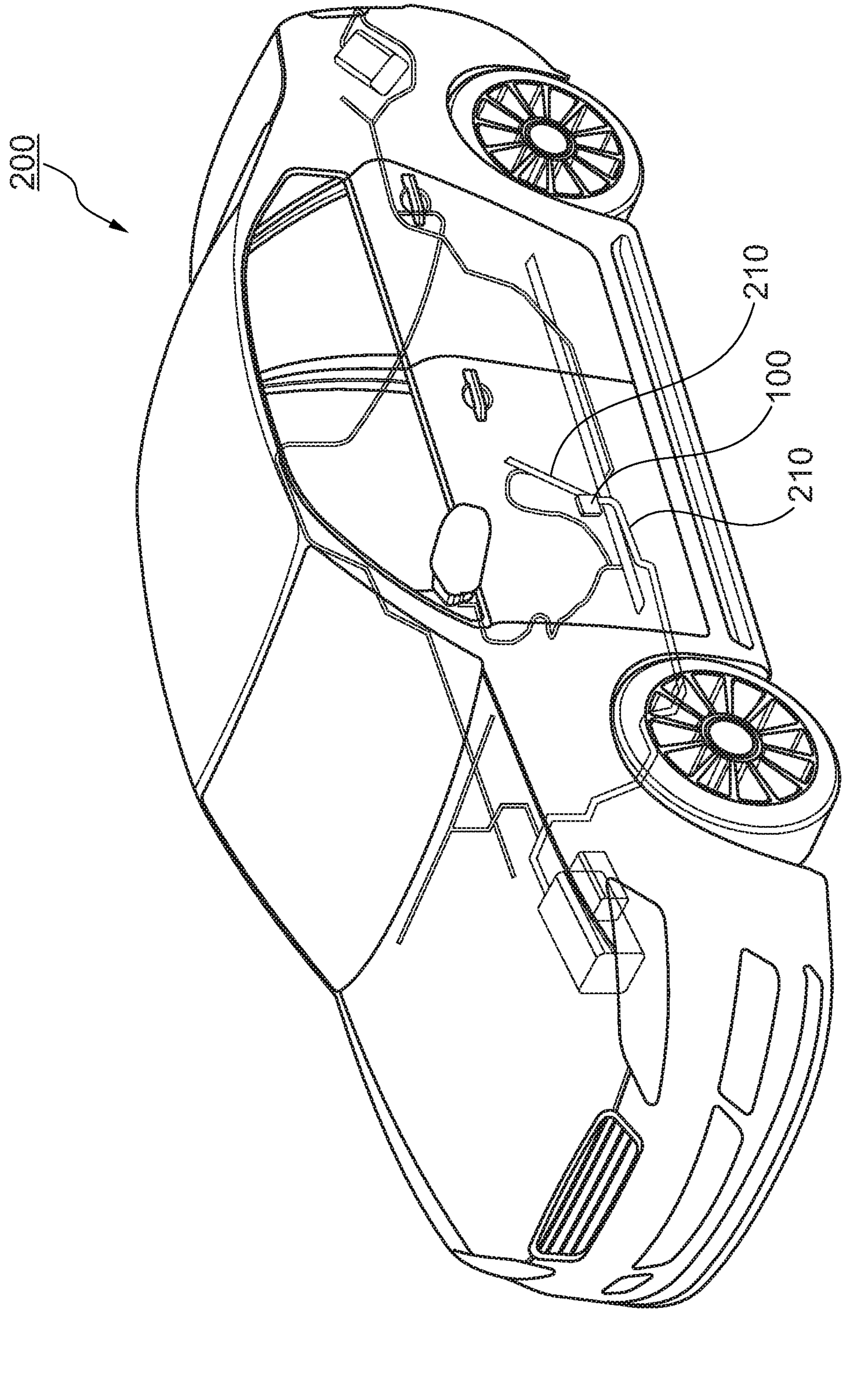
FIG. 9 shows a perspective transparent view of an example of a vehicle comprising the electrical connection assembly of FIG. 1.

FIG. 1 shows an exploded view of an example of an electrical connection assembly 100 for a wiring harness 210 (see FIGS. 3 and 9) of a vehicle 200 (see FIG. 9). Here, different parts of the electrical connection assembly 100, as they will be explained with more detail in the following, are not assembled. FIG. 7 shows an assembled state of the electrical connection assembly 100.

Figure 2:
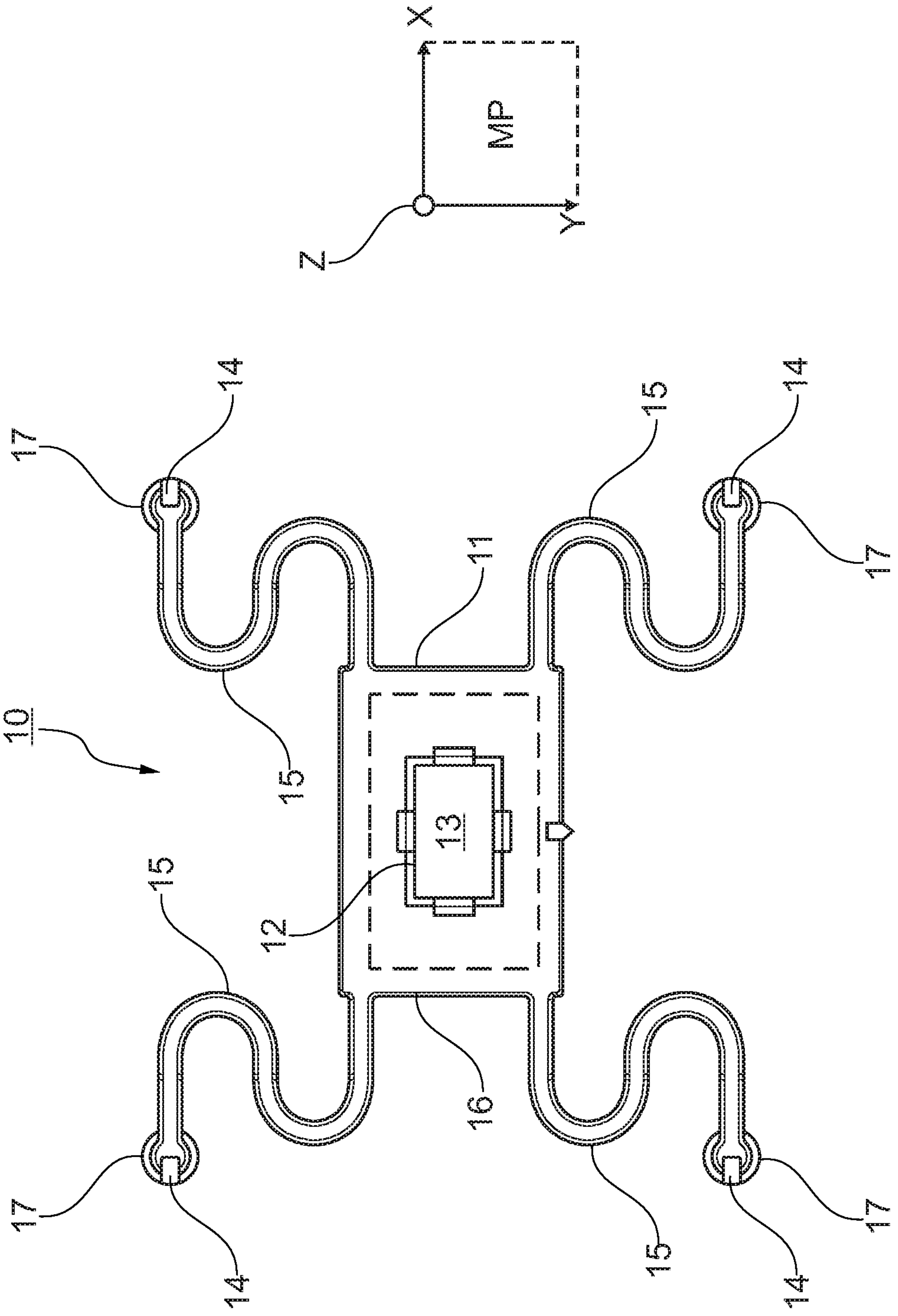
FIG. 2 shows a top view of a connector holder of the electrical connection assembly of FIG. 1.

The electrical connection assembly 100 comprises a connector holder 10 having several portions, namely a main portion 11, attachment portions 14 and spring portions 15. A top view of the connector holder 10 is shown in FIG. 2. In this example of the connector holder 10, the connector holder 10 comprises four attachment portions 14 and four spring portions 15. A different number of attachment portions 14 and spring portions 15 is possible.

Each one of the spring portions 15 is attached to the main portion 11 located in the center of the connector holder 10. Each one of the four spring portions 15 extends away from the main portion 11 in a different direction and from a different point of the main portion 11. Each one of the attachment portions 14 is located at a respective end of the spring portion 15. In this example, each one of the spring portions 15 is configured as a curved link connecting the main portion 11 with one of the attachment portions 14.

More particularly, each of the spring portions 15 extends away from a different corner of a substantially rectangular shape of the main portion 11. In this example, each one of the spring portions 15 or curved links has an S-formed or S-shaped curvature between the point of connection to the main portion 11 and its respective attachment portion 14. However, the shape of the spring portions 15 may have more curves and generally be meander-formed, which includes any number of curves along the length or longitudinal trajectory of a spring portion 15. In this example, all spring portions 15 are formed alike. However, it is possible to have different forms or sizes of the spring portions 15 in order to affect the overall spring characteristic of the connector holder 10 in different directions.

In this example, the main portion 11 corresponds in shape to the rectangular shape of the first electrical connector 40. The main portion 11 of this example has a mount interface 12, which may be designed integral with the main portion 11 or be attached thereto as a separate part. The mount interface 12 is designed such that the first electrical connector 40 can be mechanically attached to the connector holder 10. In addition, the main portion 11 has an interface aperture 13, which enables access for an electrical part such as one or multiple electrical wires to the first electrical connector 40 when the first electrical connector 40 is mounted to the main portion 11 via the mount interface 12. Despite the main portion 11 and the first electrical connector 40 being shown with rectangular shape, different shapes, such as circular, oval, octagonal etc. can be used for either one of these or both.

Generally, the connector holder 10 extends in a plane that is spanned by the axes X and Y as shown in FIGS. 1 and 2. This plane is also being referred to as a movement plane MP.

The spring portions 15 extend in the movement plane MP with their length. The S- or meander-shape extends in the movement plane MP. In width, the spring portions 15 extend along the shown Z axis perpendicular to the axes X and Y and thus perpendicular to the movement plane MP. Particularly, the spring portions 15 have a band or tape shaped profile along the Z axis, as may be taken from FIG. 3.

The attachment portions 14 at the ends of the spring portions 15 are designed as pins. These pins extend in length along the Z axis. The pins have support rings 17. The support rings 17 have a greater diameter than the pins themselves. The support rings 17 are positioned between the ends of the pins and the main portion 11 and/or the spring portions 15. Particularly, the support rings 17 are positioned slightly below a lower edge of the main portion 11 and/or the spring portions 15, which allows for a slim design.

It is possible to place the connector holder 10 on a base assembly part 30 of the electrical connection assembly 10. Fixing the connector holder 10 to the base assembly part 30 may be performed by inserting the pins into corresponding pin apertures 32 of the base assembly part 30, which is performed along the Z axis, which is also referred to herein as the assembly axis. For this purpose, the pin apertures 32 correspond in location and size to the arrangement and size of the pins. Due to the support rings 17, the main portion 11 and the spring portions 15 are being supported on top of the base assembly part 30, more particularly a center portion 33 of the base assembly part 30 that is elevated from a base surface 36 of the base assembly part 30, while being able to move freely in the movement plane MP. This is because the spring portions 15 and the main portion 11 do not contact the base assembly part 30. Instead, the pins with their support rings 17 raise the connector holder 10 to a height above the base assembly part 30. Moreover, the center portion 33 comprises a connection aperture 31 corresponding in location to the location of the interface aperture 13. This further allows for accessing the first electrical connector 40 from under the interface aperture 13. As can further be seen from FIG. 3, the main portion also comprises a widened interface aperture 16 underneath the interface aperture 13 at the top side of the main portion seen in FIG. 2.

This allows for easier access to the first electrical connector 40.

The pins are designed as rotation pins that are being able to rotate within the pin apertures 32. For this purpose, the pin apertures 32 are designed to be slightly larger in diameter than the pins. This allows the pins to rotate inside the pin apertures 32.

Figure 3:
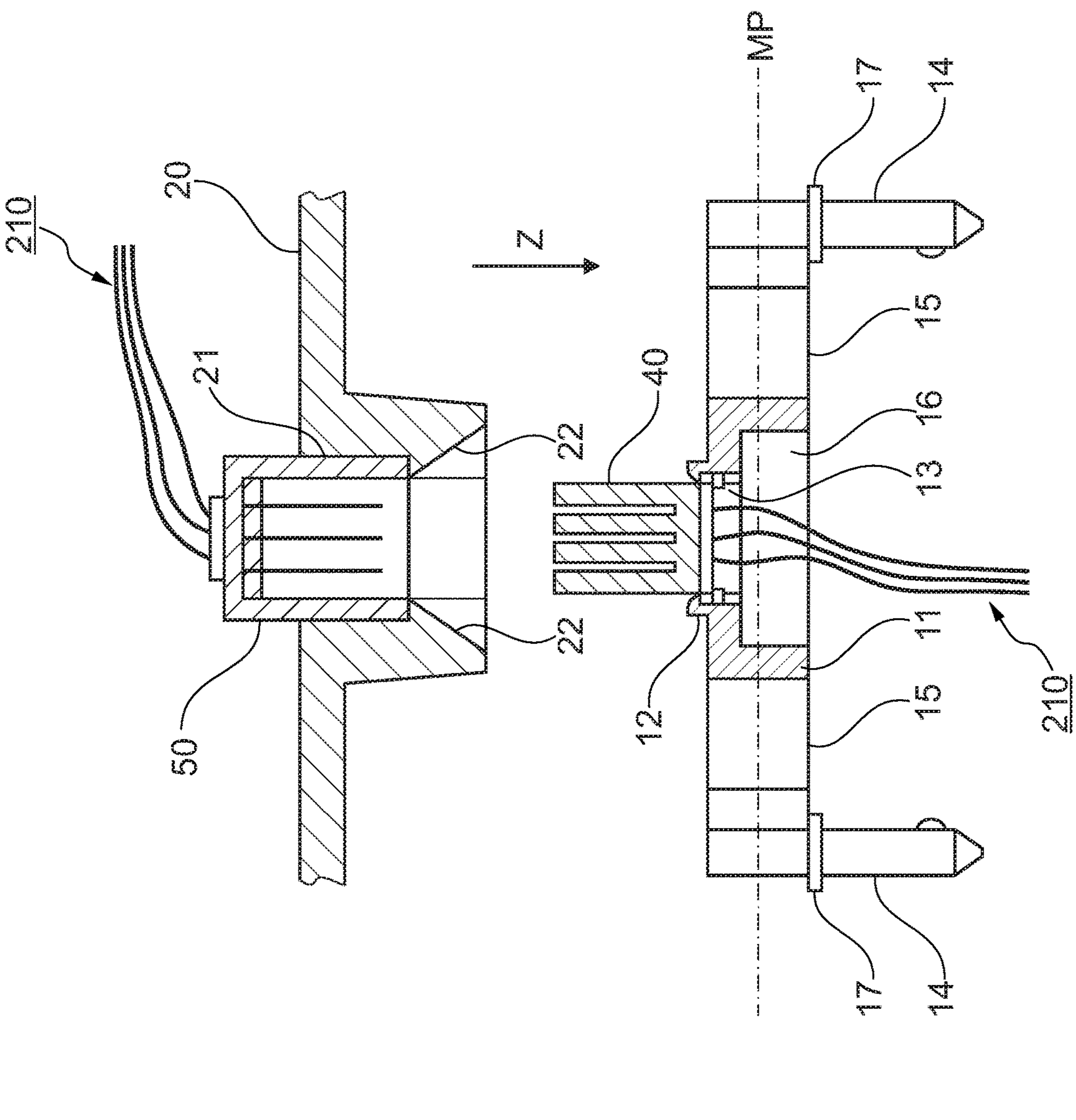
FIG. 3 shows a cross-sectional view of the electrical connection assembly of FIG. 1 while carrying out assembly of the electrical connection assembly.

As can be seen from FIG. 1 and FIG. 3, the assembly of the entire electrical connection assembly 100 can be performed along the assembly axis Z and more particularly along one direction of the assembly axis Z as indicated by the arrow in FIG. 3. The first electrical connector 40 can be mounted onto the connector holder 10 via the indicated direction along assembly axis Z in FIG. 3, the connector holder 10 can be attached via its pins to the base assembly part 30 in that same direction, the second electrical connector 50 can be mated with the first electrical connector 40 in that same direction and, finally, the further connector holder 20 can be attached to the base assembly part 30 in that same direction, as will be explained later.

Instead of assembling the first electrical connector 40 and the connector holder 10 with each other it may be provided that they are designed integrally with one another. However, the assembly axis Z for the other parts of the electrical connection assembly 100 may remain. In particular, the assembly axis Z may be defined by the mating of the first electrical connector 40 with the second electrical connector 50.

Coming back to the example of the Figures, when the first electrical connector 40 is mounted to the connector holder 10, and the first electrical connector 40 is further connected to the second electrical connector 50, the second electrical connector 50 may be subjected to a force and transfer that force acting along the X and/or Y axis to the first electrical connector 40. The first electrical connector 40 will absorb that force acting in the movement plane MP by means of the spring characteristics of the spring portions 15 of the connector holder 40 and further by means of rotation of the pins inside the pin apertures 32. Accordingly, a flexible electrical connection assembly 100 is provided, which, by means of the spring portions 15 and the pins and corresponding pin apertures 32, can react to forces along the chain of electrical connections between two electrical connectors 40, 50. This prevents the electrical connectors 40, 50 from breaking and enables flexibility in designing the wiring harness 210 inside a vehicle 200.

Besides the two electrical connectors 40, 50, the connector holder 10 and the base assembly part 30, the electrical connection assembly 100 may comprise a further connector holder 20 as shown in FIG. 1. While the connector holder 10 is designed to hold the first electrical connector 40, the further connector holder 20 is designed to hold the second electrical connector 50. One of the two electrical connectors 40, 50 may be of a plug type, while the respective other one may be of a socket type. In the example of FIG. 1, the first electrical connector 40 is designed as a plug and the second electrical connector 50 is designed as a socket.

The further connector holder 20 for the second electrical connector 50 comprises a receptacle connector interface 21 for mounting the second electrical connector 50. This feature can be seen best in the assembly operation shown in FIG. 3. There, the second electrical connector 50 is inserted into the receptacle connector interface 21 of the further connector holder 20. The further connector holder 20 and the connector holder 10, with the respective electrical connectors 40, 50 mounted, are assembled along the Z axis.

As can be seen best in FIG. 3, the receptacle connector interface 21 has a funnel shape 22. The funnel shape 22 widens in the direction away from the second electrical connector 50 and towards the first electrical connector 40. This allows for blindly guiding the first electrical connector 40 to the second electrical connector 50 and thereby blind mating the connectors 40, 50.

The base assembly part 30 and the further connector holder 20 have exemplary rectangular shapes, which substantially correspond in size of their outer dimensions to each other. However, alternative shapes may be used. The base assembly part 30 comprises four further attachment portions 23 designed as mounting domes extending along the Z axis. Alternatively, the number of further attachment portions 23 may be different and they may be designed in any other suitable way, such as pins. These further attachment portions 23 are located at the edges of the rectangular shaped further connector holder 20. While the connector holder 10 is flexible by means of its spring portions 15, the further connector holder 20 has no such flexibility and is substantially stiff. This allows for aligning or attaching the further connector holder 20 to the base assembly part 30. For this reason, the base assembly part 30 has attachment apertures 34 located and sized corresponding to the further attachment portions 23 of the further connector holder 20 such that the further attachment portions 23 may be inserted into the attachment apertures 34 thereby attaching the further connector holder 20 to the base assembly part 30. In this example, the attachment apertures 34 are located on respective edge portions 35 that are elevated from the base surface 36 of the base assembly part 30.

To secure the base assembly part 30 inside a vehicle 200, particularly to some vehicle frame or structure, along which a wire harness 210 may be provided, the base surface 36 is provided with attachment recesses 37. Via the attachment recesses 37, the base assembly part 30 can be conveniently attached to the vehicle 200. Of course, other means of attachment, such as adhesion or form fit may be used in the alternative.

As shown in FIG. 3, both electrical connectors 40, 50 are connected to a wiring harness 210 inside the vehicle 200 as depicted exemplary in FIG. 9. The wiring harness 210 is schematically illustrated by means of multiple wires in FIG. 3. Alternatively, one or both electrical connectors 40, 50 may be connected to or be part of an electrical component 60 such as the one shown in FIGS. 4 to 6.

Figure 5:
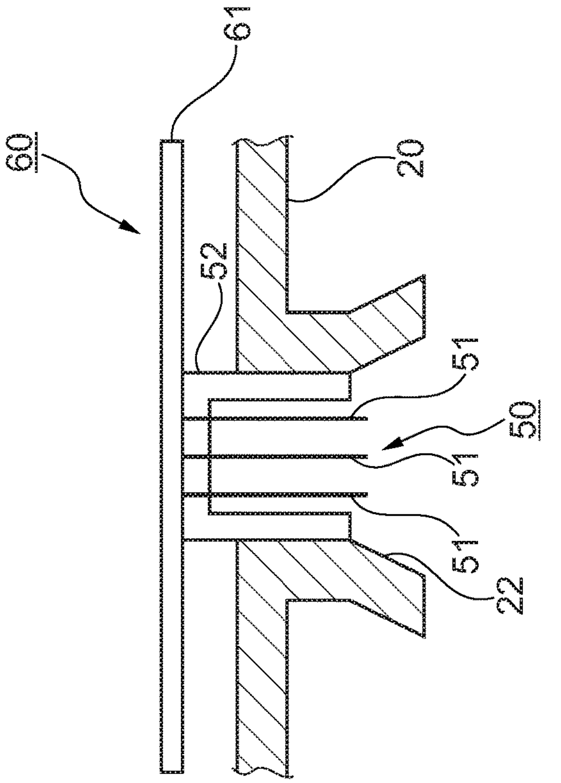
FIG. 5 shows a cross-sectional view of a second example of the electrical component according to FIG. 4.
Figure 6:
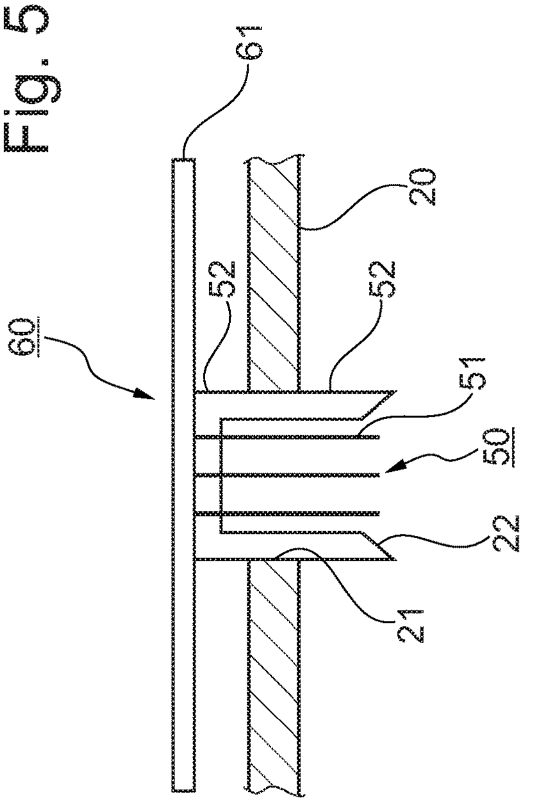
FIG. 6 shows a cross-sectional view of a third example of the electrical component according to FIG. 4.
Figure 4:
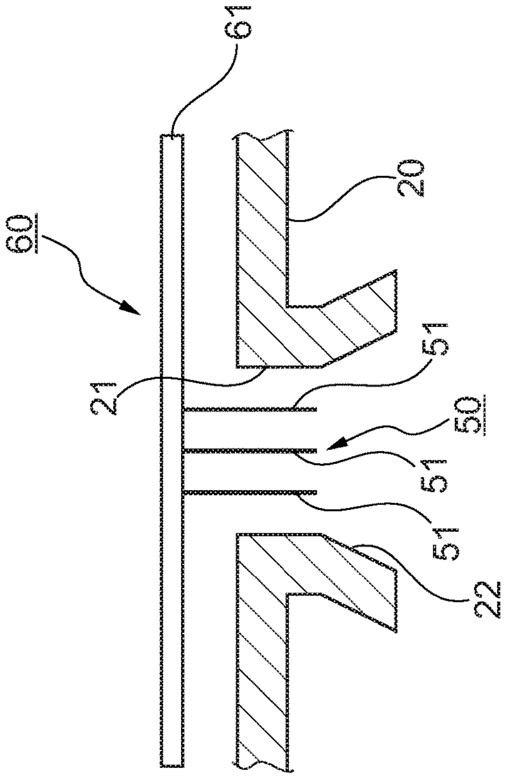
FIG. 4 shows a cross-sectional view of a first example of an electrical component in part of the electrical connection assembly of FIG. 3.

FIGS. 4 to 6 show different examples of alternatives to the upper part of the electrical connection assembly 100 in FIG. 3, namely the second electrical connector 50 and/or the further connector holder 20.

In FIG. 4, an electrical component 60 is formed by the second electrical connector 50 and a printed circuit board 61. The second electrical connector 50 is exemplary formed by means of multiple electrical connection pins 51. The second electrical connector 50 in this example does not have a connector housing, while the second electrical connector 50 in the example of FIG. 5 has a connector housing 52 surrounding the electrical connection pins 51. The electrical component 60 may be any vehicle electrical component, such as a vehicle control unit, for example.

In the example of FIG. 6, the funnel shape 22 for guiding the first electrical connector 40 to the second electrical connector 50 is provided on the connector housing 52 of the second electrical connector 50 rather than the receptacle connector interface 21 of the further connector holder 20.

FIG. 7 depicts the electrical connection assembly 100 as explained with reference to FIGS. 1 to 3 in the assembled state. The further connector holder 20 is illustrated as a transparent part. In the assembled state of the electrical connection assembly 100, when the further connector holder 20 and/or the second electrical connector 50 are subjected to a force, the connector holder 10 can react to that force by corresponding movement in the movement plane MP, effectively preventing any damage to the connection between the electrical connectors 40, 50 and possibly to the wiring harness 210 and/or electrical components 60 attached thereto. Moreover, due to the funnel shape 22, a fast and easy mating of the electrical connectors 40, 50 is possible. As previously explained, for ease of assembly, the entire assembly may be performed along a single direction of the assembly axis Z.

Figure 8:
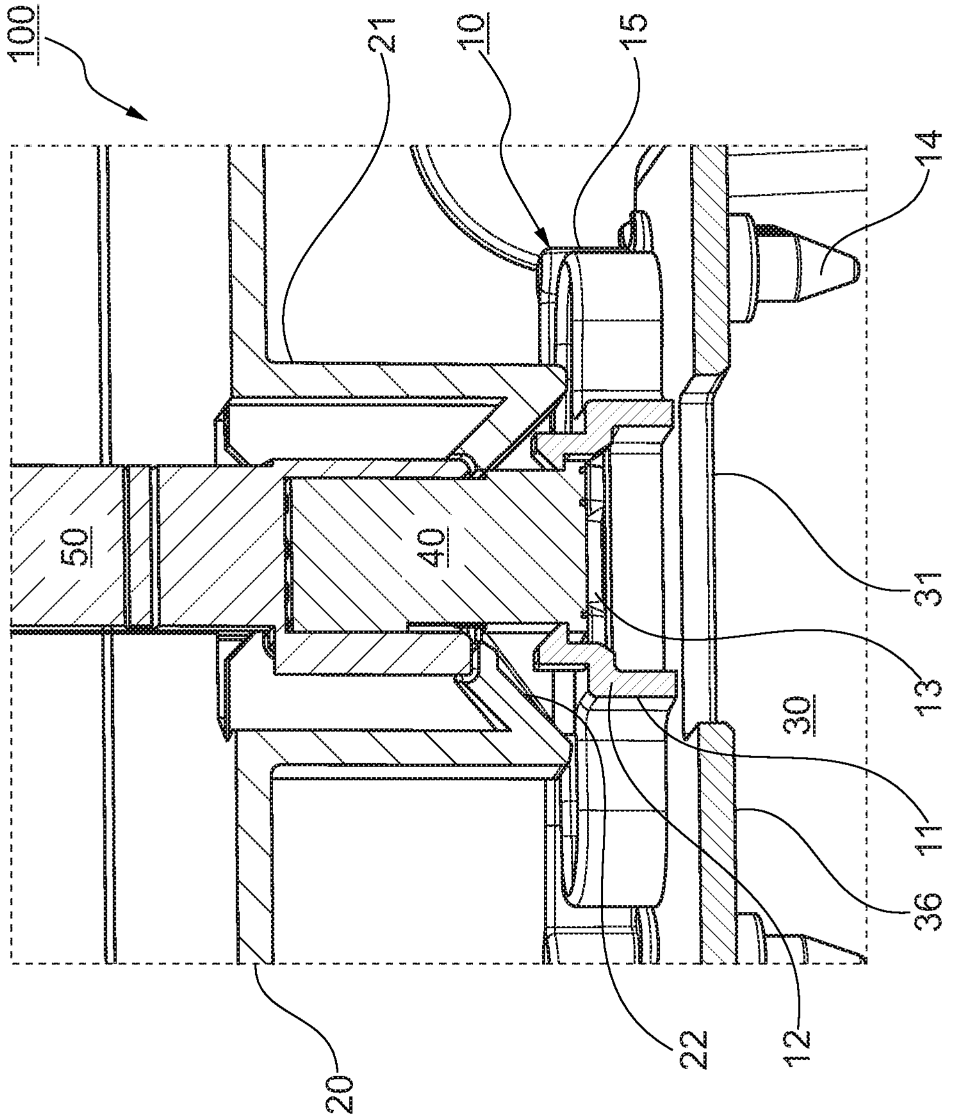
FIG. 8 shows a cross-sectional view of a detail of the assembled electrical connection assembly.

FIG. 8 shows a cross section of the electrical connection assembly 100 for a detail where the electric connectors 40, 50 are electrically connected to each other. The first electrical connector 40 is mechanically fixed via the mount interface 12 to the connector holder 10. The further connector holder 20 has the second electrical connector 50 mounted thereto. From underneath the first electrical connector 40, via the interface aperture 13 and the connection aperture 31, access is given for electrically connecting the wiring harness 210 to the first electrical connector 40.

FIG. 9 schematically depicts an example of a vehicle 200, in which the described assembled electrical connection assembly 100 is used in the connection of a wiring harness 210. Additionally, or alternatively, the electrical connection assembly 100 may be used to connect to one or more electrical component 60, such as previously described, or to connect a wiring harness 210 to such electrical component 60.

Other variations to the disclosed examples can be understood and effected by those skilled in the art in practicing the claimed disclosure, from the study of the drawings, the disclosure, and the appended claims. In the claims the word “comprising” or “having” does not exclude other elements or steps and the indefinite article “a” or “an” does not exclude a plurality. The mere fact that certain measures are recited in mutually different dependent claims does not indicate that a combination of these measures cannot be used to advantage. Any reference signs in the claims should not be construed as limiting the scope of the claims.

LIST OF REFERENCE SIGNS

10 connector holder
11 main portion
12 mount interface
13 interface aperture
14 attachment portion
15 spring portion
16 widened interface aperture
17 support rings
20 further connector holder
21 receptacle connector interface
22 funnel shape
23 further attachment portion
30 base assembly part
31 connection aperture
32 pin aperture
33 center portion
34 attachment aperture
35 edge portion
36 base surface
37 attachment recess
40 first electrical connector
50 second electrical connector
51 electrical connection pin
52 connector housing
60 electrical component
61 printed circuit board
100 electrical connection assembly
200 vehicle
210 wiring harness

What is claimed is:

1. A connector holder for an electrical connection assembly for a wiring harness of a vehicle, the connector holder comprising:

a main portion for attaching a first electrical connector of the electrical connection assembly thereto or having the first electrical connector attached thereto, a second electrical connector being connectable to the first electrical connector along an assembly axis, the assembly axis extending along the attachment of the first electrical connector to the main portion;

at least two attachment portions for attaching the connector holder to a base assembly part of the electrical connection assembly; and at least two spring portions, each of the spring portions being connected to a respective one of the attachment portions and configured as a curved link between the main portion and the respective attachment portion, and each of the spring portions having a spring characteristic to allow movement of the main portion in a movement plane oblique to the assembly axis when the connector holder is attached to the base assembly part by means of the attachment portions.

2. The connector holder according to claim 1, wherein the main portion comprises a mount interface for receiving a first electrical connector of the electrical connection assembly along the assembly axis and mounting the first electrical connector to the main portion.

3. The connector holder according to claim 1, wherein the main portion comprises an interface aperture enabling access for electrical connection to the first electrical connector when the first electrical connector is attached to the main portion.

4. The connector holder according to claim 1, wherein the movement plane is substantially perpendicular to the assembly axis.

5. The connector holder according to claim 1, wherein the curved links comprise an S-formed or meander-formed curvature, or the curved links comprise a band or tape shaped profile.

6. The connector holder according to claim 1, wherein the attachment portions are designed as pins, and wherein the pins particularly extend in length along the assembly axis or substantially perpendicular to the movement plane.

7. The connector holder according to claim 6, wherein the pins are designed as rotation pins, and wherein the rotation pins are able to rotate within pin apertures of the base assembly part, or wherein the pins comprise circumferentially provided supporting rings for supporting the connector holder on the base assembly part when the pins are inserted into pin apertures of the base assembly part.

8. The connector holder according to claim 1, wherein the connector holder comprises at least four attachment portions and at least four spring portions.

9. An electrical connection assembly for a wiring harness of a vehicle, the electrical connection assembly comprising:

a connector holder comprising:

a main portion for attaching a first electrical connector of the electrical connection assembly thereto or having the first electrical connector attached thereto, a second electrical connector being connectable to the first electrical connector along an assembly axis, the assembly axis extending along the attachment of the first electrical connector to the main portion;

at least two attachment portions for attaching the connector holder to a base assembly part of the electrical connection assembly; and at least two spring portions, each of the spring portions being connected to a respective one of the attachment portions and configured as a curved link between the main portion and the respective attachment portion, and each of the spring portions having a spring characteristic to allow movement of the main portion in a movement plane oblique to the assembly axis when the connector holder is attached to the base assembly part by means of the attachment portions, wherein the first electrical connector electrically connects to the second electrical connector of the electrical connection assembly, and wherein the first electrical connector is attached to the connector holder.

10. The electrical connection assembly according to claim 9, wherein the electrical connection assembly further comprises:

a further connector holder, wherein the further connector holder comprises a receptacle connector interface for receiving the second electrical connector along the assembly axis and mounting the second electrical connector to the further connector holder.

11. The electrical connection assembly according to claim 10, wherein the further connector holder comprises at least two further attachment portions for attaching the further connector holder to the base assembly part.

12. The electrical connection assembly according to claim 10, wherein the receptacle connector interface or the second electrical connector comprise a funnel shape for guiding the first electrical connector for electrical connection to the second electrical connector mounted to the further connector holder.

13. The electrical connection assembly according to claim 9, wherein the electrical connection assembly further comprises:

an electrical component, wherein the electrical component comprises the second electrical connector and a printed-circuit board connected to the second electrical connector.

14. A vehicle, comprising:

an electrical connection assembly for a wiring harness of the vehicle, the electrical connection assembly comprising:

a connector holder comprising:

a main portion for attaching a first electrical connector of the electrical connection assembly thereto or having the first electrical connector attached thereto, a second electrical connector being connectable to the first electrical connector along an assembly axis, the assembly axis extending along the attachment of the first electrical connector to the main portion;

at least two attachment portions for attaching the connector holder to a base assembly part of the electrical connection assembly; and at least two spring portions, each of the spring portions being connected to a respective one of the attachment portions and configured as a curved link between the main portion and the respective attachment portion, and each of the spring portions having a spring characteristic to allow movement of the main portion in a movement plane oblique to the assembly axis when the connector holder is attached to the base assembly part by means of the attachment portions, wherein the first electrical connector electrically connects to the second electrical connector of the electrical connection assembly, wherein the first electrical connector is attached to the connector holder, and wherein the wiring harness of the vehicle is electrically connected to the first electrical connector or the second electrical connector.

15. The vehicle of claim 14, wherein the electrical connection assembly further comprises:

a further connector holder, wherein the further connector holder comprises a receptacle connector interface for receiving the second electrical connector along the assembly axis and mounting the second electrical connector to the further connector holder.

16. The vehicle of claim 15, wherein the further connector holder comprises at least two further attachment portions for attaching the further connector holder to the base assembly part.

17. The vehicle of claim 15, wherein the receptacle connector interface or the second electrical connector comprise a funnel shape for guiding the first electrical connector for electrical connection to the second electrical connector mounted to the further connector holder.

18. The vehicle of claim 14, wherein the electrical connection assembly further comprises:

an electrical component, wherein the electrical component comprises the second electrical connector and a printed-circuit board connected to the second electrical connector.

19. The vehicle of claim 14, wherein the main portion comprises a mount interface for receiving a first electrical connector of the electrical connection assembly along the assembly axis and mounting the first electrical connector to the main portion.

20. The vehicle of claim 14, wherein the curved links comprise an S-formed or meander-formed curvature, or the curved links comprise a band or tape shaped profile.

* * * * *